United States Patent [19]

Netteland et al.

[11] 3,906,945

[45] Sept. 23, 1975

[54] ENDOTHERMAL CARBON DIOXIDE ABSORPTION

[75] Inventors: Loyal G. Netteland, East Aurora; Clifford E. Heintz, Buffalo, both of N.Y.

[73] Assignee: A-T-O Inc., Willoughby, Ohio

[22] Filed: Apr. 29, 1974

[21] Appl. No.: 464,738

[52] U.S. Cl. ............................. 128/191 R; 423/230
[51] Int. Cl.² ................................. A62B 19/00
[58] Field of Search........ 128/191 R, 202, 203, 188, 128/142.6, 142; 423/230, 641, 422

[56] References Cited
UNITED STATES PATENTS

| | | | |
|---|---|---|---|
| 2,629,652 | 2/1953 | Schechter | 423/641 |
| 2,992,703 | 7/1961 | Vasan et al. | 423/230 |
| 3,710,553 | 1/1973 | Parker | 128/191 R |

Primary Examiner—Richard A. Gaudet
Assistant Examiner—Henry J. Recla
Attorney, Agent, or Firm—Christel & Bean

[57] ABSTRACT

The absorption of $CO_2$ from gas streams by lithium hydroxide can be caused to proceed at least partially by the reaction

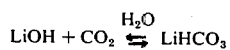

$$LiOH + CO_2 \underset{}{\overset{H_2O}{\rightleftarrows}} LiHCO_3$$

The reaction is endothermal, and more efficient than the normally occurring reaction. The presence of a molecular sieve and water favor the bicarbonate reaction.

6 Claims, No Drawings

ENDOTHERMAL CARBON DIOXIDE ABSORPTION

The present invention relates to the absorption of carbon dioxide from gas streams. More particularly, it relates to the absorption of carbon dioxide gas from closed atmospheres to maintain healthful and safe conditions for humans and animals which breath such atmospheres. Still more particularly, the present invention relates to the maintenance of breathable atmospheric conditions in closed or partially closed environmental contexts, including for example, space vehicles, submarines, underwater recirculating breathing apparatus, and closed circuit breathing apparatus used in hazardous conditions, such as fire fighting, as gas-masks and the like, by the absorption of exhalations of carbon dioxide. It also relates to a novel and surprisingly effective absorptive medium for the absorption of carbon dioxide, reduction of heat, reduction of water vapor and to the method of the use of such medium to absorb carbon dioxide from gas streams.

The present invention further relates to absorption medium which is operative over a wide variety of conditions, which is readily and safely utilizable and handable in closed environments.

Methods and materials for removing carbon dioxide from confined breathing atmospheres such as found in submarines and spacecraft have been known for sometime. Representative of such techniques is the use of activated carbon, specially formed sodium aluminum silicate compounds and alkali hydroxides. However, such prior art methods suffer from a number of disadvantages and limitations.

For example, activated carbon has relatively low absorption capacity at low pressures (below 50 psig) and its absorption capacity increases as temperature decreases requiring precooling of the bed before adsorption as well as continuous precooling of the inlet feed gas mixture containing the $CO_2$ to be removed.

Sodium aluminum silicate compounds have high affinity for water vapor which reduces the overall $CO_2$ absorption capacity.

Alkali hydroxides are subject to moisture attack with subsequent caking thus severely limiting capacity. Considerable levels of alkali dust become entrained in the air flow as well, posing a considerable hazard to the user. In addition, the use of solid alkali hydroxides results in the evolution of considerable amounts of heat which are awkward to deal with at best.

The prior methods used for the removal of carbon dioxide from an atmosphere have also involved the use of washing the carbon dioxide containing atmosphere with caustic solutions which would result in the formation of metallic carbonates. Such solutions are quite easily made, relatively inexpensive and efficient in operation. These systems are quite inexpensive to operate and the metallic carbonates formed usually were consumed in by-product uses or simply discarded as waste.

Where availability or reagents, energy sources and space in which to carry on the treatment of carbon dioxide containing atmospheres are not limited for practical purposes, conventional systems have proved satisfactory. The problem facing the art is that of removing by-products of respiration such as carbon dioxide and water vapor (to prevent fogging, e.g. of the face mask lens) by such means that the minimum of space and weight is taken up with a minimum heat output.

Accordingly, it is an object of the present invention to provide an improved material for effecting absorption of $CO_2$ from confined breathing atmospheres.

Another object of the present invention is to provide a method for making said $CO_2$ sorbent material.

This and other objects are achieved by providing a new, dry $CO_2$ sorbent material which possesses a number of advantageous characteristics.

The above objects and advantages may be further understood by reference to the following detailed disclosure.

In a dry $CO_2$ removal system the sorbent bed is packed with a material which sorbs $CO_2$ upon contact with moist air containing $CO_2$.

The more effective a sorbent is in $CO_2$ removal, the greater will be the amount of $CO_2$ contained in the smallest practical volume and weight. The problem of sorbent bed volume is particularly important in a submarine, spacecraft, or in user-carried personal breathing equipment and the like, because of the overall volume and weight limitations. Although larger beds provide for longer operating cycles they also require an increase in the size and weight of the device.

It has been found that all the foregoing objects and more are attained by a combination of materials which result in outstanding capacity for carbon dioxide absorption with very little generation of heat. The present invention is based on the discovery that, when combined in proper sequence, a combination of a lithium hydroxide bed and a specially treated molecular sieve bed, disposed downstream of the LiOH, operate as a surprisingly effective absorbent for carbon dioxide. The results are exceptional in that the absorbent capacity is increased over that of free lithium hydroxide by more than would be expected from the presence of the molecular sieve.

Prior systems for the absorption of carbon dioxide based on the reaction of the gas with lithium hydroxide have been based on the reaction represented by the following formula:

$$2LiOH + CO_2 \rightarrow Li_2CO_3 + H_2O \quad (I)$$

The noted reaction is strongly exothermal, with the evolution of 290 kilocalories of heat per mole. In addition, the reaction requires two moles lithium hydroxide for each mole of carbon dioxide reacted, and an appreciable amount of water is formed. All these factors have proved substantial problems in the art. It has now been found that by use of the absorbent composition in accordance with the present invention, it is possible to more effectively absorb carbon dioxide from gas streams whereby, in part, the reaction of carbon dioxide with lithium hydroxide is altered by the effect of water combined with a molecular sieve to that represented by the following formula:

$$\overset{H_2O}{LiOH + CO_2 \rightleftarrows LiHCO_3} \quad (II)$$

The reaction to the bicarbonate is strongly endothermic, requiring 465 kilocalories per mole, without the formation of water, and absorbs one mole of carbon dioxide for each mole of lithium hydroxide consumed.

It is evident that greatest efficiency and economy of operation are attained when the flow of carbon dioxide into the absorbent is maintained at a substantially constant level and at a substantially continuous flow rate so that the equilibrium conditions are sustained.

The absorbent combination of lithium hydroxide followed by a bed of molecular sieve combined with a controlled amount of water, provided in accordance with the present invention inherently favor reaction II when sufficient heat is generated. The relative proportions of the sequential compositions are important, requiring for each mole of sodium aluminum silicate about 45 to 55 moles, preferably 50 moles of water. The initial water content should be about 40 to 60, preferably 51 to 55 moles per mole of the molecular sieve.

Molecular sieves are three-dimensional crystalline aluminosilicates physically characterized by uniformly sized small pores leading from the exterior surface to an internal three-dimensional cagework formed of interconnected silica and alumini tetrahedra. Only about 1% of the available surface area of molecular sieves is on the outer side so that most of the adsorption occurs by passage of molecules through the pores into this inner cagework, and adsorption therein. This is in contrast to conventional absorbents such as silica gel and activated charcoal which do not have large inner adsorption regions and consequently are characterized by lower and adsorptive capacity. Molecular sieves have a particularly strong affinity for molecules which are unsaturated, polar or polarizable, thereby accounting for their selectivity for ethylene (an unsaturated molecule), water and carbon dioxide (a polar molecule). The absorbent is preferably employed in the form of compressed pellets which may contain a clay binder.

Zeolite X is a synthetic crystalline zeolitic molecular sieve which may be represented by the formula:

$$0.9 \pm 0.2 M_{2/n}O : Al_2O_3 : 2.5 \pm 0.5 SiO_2 : yH_2O$$

wherein M represents a metal, particularly alkali and alkaline earth metals, $n$ is the valence of M, and y may have any value up to about 8 dependent on the identity of M and the degree of hydration of the crystalline zeolite. Sodium zeolite X has an apparent pore of about 10 Angstrom units. Zeolite X, its X-ray diffraction pattern, its properties, and methods for its preparation are described in detail in U.S. Pat. No. 2,882,244, issued Apr. 14, 1959.

While other molecular sieves might be used, Zeolite X is the form preferred in the practice of the present invention, particularly in the form known as Zeolite 13X.

In operation, the lithium hydroxide is disposed in an absorption zone, followed immediately in the flow stream by the mixture of molecular sieve and water. Recirculation of the gas stream through the sequential beds results in the substantially complete removal of carbon dioxide. As an additional feature, the relative humidity is reduced to a very low level. Under the conditions obtaining in the system, a distinctive reduction in heat output is realized, and initiating LiOH dust is substantially totally eliminated.

The considerable reduction in heat output, monitoring of pH in the absorption beds, and analysis of the absorbent after use all confirm the presence of $LiHCO_3$. It is not at present known how or why the bicarbonate form is produced or what causes the selectivity of the process for the bicarbonate. It has been found, however, that the reaction does not proceed measurably if the LiOH and the hydrated molecular sieve are mixed, or if the molecular sieve is disposed upstream of the LiOH bed.

In practice, it is convenient to place both media in a single canister separated, for example, by a wire mesh or other particular filter media. The canister, provided with inlet and outlet at opposite ends, is then connected in the system so that the LiOH is at the entry end and the hydrated molecular sieve is immediately downstream.

The best mode of practicing the present invention is shown in the following examples, intended to serve as an illustrated guide to those in the art and not intended to be limiting upon the scope of the invention.

EXAMPLE I

A canister provided with an inlet and an outlet was fitted with a 40 mesh wire screen to separate the canister into two separate compartments. The first, inlet compartment was twice the volume of the second and was filled with dry granular lithium hydroxide. The second compartment was filled with hydrated molecular sieve formed in the following fashion.

Sodium aluminum silicate, Zeolite 13X, was heated at 600°F for 2 hours under a vacuum of 29 inches of Hg and then cooled in a desiccator. The dried molecular sieve was combined with distilled water in the proportion 51 moles $H_2O$ per mole of Zeolite. This mixture was placed in a covered air tight container and left to stand for about 24 hours to permit equilibrium and was then placed in the second, outlet side compartment of the canister.

$O_2$ was fed at 4 LPM through a filter recirculator system into a chamber. $CO_2$ at 100% humidity was also fed into the chamber at 1.7 LPM. The chamber was fitted with a relief valve so that pressure build-up within the chamber was limited to 1–2 in.water; $CO_2$ content, moisture vapor content, gas temperature and filter bed temperature were monitored. Although $O_2$ was fed at only 4 LPM a recirculator system, in this case driven by the oxygen flow, recirculated gas from the chamber through the absorbent bed at a rate of about 30 LPM.

It was found that the temperature in the canister rose to about 98°F, where it stabilized, while the scrubbed gas stream temperature rose very gradually from ambient (about 72°F) to a maximum of 88°F after 15 minutes on stream.

EXAMPLE II

To show the significance of the degree of hydration of the molecular sieve, Example I was repeated where the water of hydration of the molecular sieve was varied.

The water content of the zeolite in each run, and the canister and exhaust gas temperatures at the end of the 15 minute run are shown in the following Table:

TABLE

| Water, moles | Canister Temperature | Gas Temperature |
|---|---|---|
| | °F | °F |
| Anhydrous | 208 | 162 |
| 30–36 | 182 | 152 |
| 51–55 | 98 | 88 |
| 71–75 | 180 | 151 |
| 125–130 | 190 | 158 |
| 200–250 | 193 | 160 |

As shown by the Table, the levels of hydration outside the specified range perform substantially as lithium hydroxide absorption without any molecular sieve present at all.

Accordingly, it is seen that with the instant invention a relatively low heat output results, avoiding the problems accompanying a high heat build-up in a closed circuit breathing system. The endothermic reaction, and the molecular sieve, result in a very low water vapor content in the breathing circuit, thereby avoiding condensation and fogging. LiOH dust, which can be a serious irritant, is effectively inhibited by the molecular sieve from entering the recirculating stream.

What is claimed is:

1. The method of absorbing carbon dioxide from respiratory gases in a recirculatory breathing apparatus comprising:
   a. forming a recirculatory gas stream flow from a breathing zone to a carbon dioxide absorption zone and back to said breathing zone in a circulatory flow system;
   b. introducing to said breathing zone carbon dioxide containing respiratory exhalations;
   c. removing from said breathing zone respiratory exhalations;
   d. causing said exhalations to flow in said recirculating gas stream flow;
   e. in said carbon dioxide absorption zone, causing recirculating gas stream to pass through a first chamber containing lithium hydroxide and immediately thereafter through a second chamber containing hydrated molecular sieve containing about 40 to 60 moles, per mole of said sieve, of water, causing said carbon dioxide to react with said lithium hydroxide at least in part by the reaction $$LiOH + CO_2 \underset{}{\overset{H_2O}{\rightleftarrows}} LiHCO_3.$$

2. The method of claim 1 wherein said molecular sieve is a crystalline zeolite.

3. The method of claim 2 wherein said zeolite is zeolite X.

4. The method of claim 3 wherein said zeolite is zeolite 13X.

5. The method of claim 4, wherein said lithium hydroxide and said hydrated molecular sieve are present in relative volume ratio of about 2:1.

6. The method of claim 1 wherein said gas stream is passed through said absorbent medium continuously.

* * * * *